US008857699B2

(12) United States Patent
Sjodin et al.

(10) Patent No.: US 8,857,699 B2
(45) Date of Patent: Oct. 14, 2014

(54) METHOD OF BRAZING ARTICLES OF STAINLESS STEEL

(75) Inventors: Per Sjodin, Lund (SE); Jens Rassmus, Malmo (SE)

(73) Assignee: Alfa Laval Corporate AB, Lund (SE)

( * ) Notice: Subject to any disclaimer, the term of this patent is extended or adjusted under 35 U.S.C. 154(b) by 1638 days.

(21) Appl. No.: 11/915,184

(22) PCT Filed: May 24, 2006

(86) PCT No.: PCT/SE2006/000618
§ 371 (c)(1),
(2), (4) Date: Feb. 7, 2008

(87) PCT Pub. No.: WO2006/126953
PCT Pub. Date: Nov. 30, 2006

(65) Prior Publication Data
US 2008/0199718 A1 Aug. 21, 2008

(30) Foreign Application Priority Data

May 26, 2005 (SE) .................................. 0501198-6
May 26, 2005 (SE) .................................. 0501199-4

(51) Int. Cl.
| | |
|---|---|
| B23K 35/30 | (2006.01) |
| F28F 21/08 | (2006.01) |
| C22C 38/54 | (2006.01) |
| B23K 1/00 | (2006.01) |
| C22C 38/00 | (2006.01) |
| B22F 9/08 | (2006.01) |
| C22C 38/34 | (2006.01) |
| B23K 1/008 | (2006.01) |
| B23K 1/19 | (2006.01) |
| B32B 15/01 | (2006.01) |
| B22F 9/04 | (2006.01) |

(52) U.S. Cl.
CPC ................. *B23K 35/30* (2013.01); *C22C 38/54* (2013.01); *B23K 2201/14* (2013.01); *F28F 21/083* (2013.01); *B23K 1/0012* (2013.01); *C22C 38/002* (2013.01); *B22F 2009/041* (2013.01); *B22F 9/082* (2013.01); *C22C 38/34* (2013.01); *B23K 1/008* (2013.01); *F28F 21/089* (2013.01); *B23K 1/0008* (2013.01); *B23K 1/19* (2013.01); *B22F 9/04* (2013.01); *B32B 15/011* (2013.01); *Y10S 165/905* (2013.01)
USPC ........ 228/183; 228/232; 228/227; 228/233.2; 228/258; 228/262.42; 428/685; 165/905

(58) Field of Classification Search
None
See application file for complete search history.

(56) References Cited

U.S. PATENT DOCUMENTS

| 2,843,478 A | 7/1958 | Cost | |
|---|---|---|---|
| 4,402,742 A * | 9/1983 | Pattanaik | ........................ 420/50 |

(Continued)

FOREIGN PATENT DOCUMENTS

| DE | 102 52 577 | 11/2002 |
|---|---|---|
| DE | 10252577 A1 | 5/2004 |

(Continued)

OTHER PUBLICATIONS

PCT/SE2006/000618 International Search Report Sep. 8, 2006.

(Continued)

*Primary Examiner* — John J Zimmerman
(74) *Attorney, Agent, or Firm* — MGK, LLC

(57) ABSTRACT

The present invention relates to a method of brazing articles of stainless steel, which method comprises the following steps: step (i) applying an iron-based brazing filler material to parts of stainless steel; step (ii) optionally assembling the parts; step (iii) heating the parts from step (i) or step (ii) to a temperature of at least about 1000° C. in a non-oxidizing atmosphere, a reducing atmosphere, vacuum or combinations thereof, and heating the parts at the temperature of at least about 1000° C. for at least about 15 minutes; step (iv) providing articles having an average hardness of less than about 600 HV1 of the obtained brazed areas. The present invention relates also to brazed articles of stainless steel.

13 Claims, 2 Drawing Sheets

(56) References Cited

U.S. PATENT DOCUMENTS

| | | | |
|---|---|---|---|
| 4,410,604 A | | 10/1983 | Pohlman et al. |
| 4,516,716 A | | 5/1985 | Coad |
| 5,316,997 A | * | 5/1994 | Toyoda et al. ................. 502/314 |
| 6,149,051 A | * | 11/2000 | Vollmer et al. ........... 228/262.72 |
| 6,200,690 B1 | * | 3/2001 | Rabinkin ...................... 428/606 |
| 6,656,292 B1 | * | 12/2003 | Rabinkin et al. ................ 148/24 |
| 2004/0056024 A1 | * | 3/2004 | Lee ............................... 219/680 |
| 2004/0056074 A1 | * | 3/2004 | Sjodin ........................... 228/183 |
| 2004/0108366 A1 | * | 6/2004 | Rabinkin et al. .............. 228/183 |
| 2004/0181941 A1 | * | 9/2004 | Johannes Rassmus et al. ........................ 29/890.054 |
| 2004/0184945 A1 | * | 9/2004 | Sjodin ............................. 420/42 |
| 2006/0090820 A1 | * | 5/2006 | Rabinkin et al. .............. 148/403 |

FOREIGN PATENT DOCUMENTS

| | | |
|---|---|---|
| GB | 797800 | 7/1958 |
| JP | 59-101244 | 6/1984 |
| JP | 59101233 A | 6/1984 |
| WO | 0138327 A2 | 5/2001 |
| WO | 02/38327 * | 5/2002 |
| WO | WO 02/38327 | 5/2002 |
| WO | 02/090032 * | 11/2002 |
| WO | 02/098600 * | 12/2002 |
| WO | 02098600 A1 | 12/2002 |
| WO | WO 02/098600 | 12/2002 |
| WO | WO 2005/038382 | 4/2005 |

OTHER PUBLICATIONS

Brazing Handbook, Fourth Ed.; "Brazement Design and Drafting Room Practice", American Welding Society; p. 13.

Sjodin, Per et al.; "A Novel Type of All-Stainless Steel Plate Heat Exchanger"; Proceedings of Fifth International Conference on Enhanced, Compact and Ultra-Compact Heat Exchangers: Science, Engineering and Technology; Engineering Conferences International; Hoboken, NJ, USA; Sep. 2005; pp. 215-220.

Rassmus, Jens et al.; "Joining aspects on large plate heat exchangers in stainless steel"; Proceedings of the 3rd International Brazing and Soldering Conference; San Antonio, TX, USA; Apr. 24-26, 2006; pp. 357-362.

Brazing Handbook, Fourth Ed.; "Brazement Design and Drafting Room Practice"; American Welding Society; p. 13.

Sjodin, P.; "Improved Performance of Brazed Plate Heat Exchangers Made of Stainless Steel Type EN 1.4401 (UNS S31600) When Using a Iron-Based Brazed Filler"; Brazing, High Temperature Brazing and Diffusion Welding; 2004; ISBN 3-87155-685-8; pp. 94-95.

Miyazawa, Yasuyuki; et al. "Wide Gap Brazing of Stainless Steel Using Ni Added BNi-5 Powder Filler"; Journal of the Japan Society for Technology of Plasticity; vol. 44, No. 513; Abstract.

Wielage, B; et al. "New Developments in High Temperature Brazing"; German Welding Society; pp. 365-369.

Bach, F.W.; et al.; "Development of Ledeburitic Filler Metals for High Temperature Brazing"; Brazing, High Temperature Brazing and Diffusion Welding; 2004; ISBN 3-87155-685-8; pp. 353-357.

* cited by examiner

METHOD OF BRAZING ARTICLES OF STAINLESS STEEL

The present invention relates to a method of brazing articles of stainless steel, and the invention relates further to an article of stainless steel.

BACKGROUND OF INVENTION

Sealing of crevices and pores, and brazing of joints are important factors when producing brazed articles, especially when producing fluid tight articles without leakage. When the joints, crevices and pores are large in area, then the ability of sealing and filling increases its importance for the braze filler, but ability to seal and fill is not necessarily linked to the strength of the brazed zone or area. Therefore, one requirement is to provide articles, which have enough strength for the intended purpose or use. Different methods for brazing are developed and are described for instance in U.S. Pat. No. 6,109,505 and U.S. Pat. No. 4,516,716, which documents disclose brazing of stainless steel.

The Invention

In accordance with one aspect of this invention there is provided a method of brazing or soldering articles of stainless steel. Hereinafter brazing is used, but it should be understood that the term also comprises soldering, and that the material of the invention comprises soldering material and brazing material. Thus, the method of brazing comprises: step (i) applying an iron-based brazing filler material to parts of stainless steel; step (ii) optionally assembling the parts; step (iii) heating the parts from step (i) or step (ii) to a temperature of at least about 1000° C. in a non-oxidizing atmosphere, a reducing atmosphere, vacuum or combinations thereof, and heating the parts at the temperature of at least about 1000° C. for at least 15 minutes; step (iv) providing articles having an average hardness of less than about 600 HV1 (Vickers hardness test—Part 1: Test method (ISO 6507-1:1997)) of the obtained brazed areas; and step (v) optionally repeating one or more of step (i), step (ii) and step (iii).

According to an alternative aspect of the present invention there is provided a method of brazing articles of stainless steel, which comprises a method having an alternative step (iv) comprising sealing or filling joints, pores, cracks, gaps, or crevices larger than about 76 μm.

The present invention relates further to an article of stainless steel obtained by the method, wherein the obtained brazed areas, joints, pores, cracks, gaps, or crevices having a tensile strength of at least about 110 N/mm².

The present invention relates further to an article of stainless steel obtained by the method, wherein the obtained brazed areas, joints, pores, cracks, gaps, or crevices having an average hardness less than 600 HV1.

Even though the thermal expansion coefficient is the same for a small object and a large object of the same material, the larger object will have a larger total expansion. If one of two objects, with the same length at the same temperature, is heated, the difference in length will be proportional to the size of the object for the same difference in temperature. Both of those facts give rise to larger crevices, which brazing filler materials have to be able to fill. Thus, large size, i.e. area, length, broadness, thickness etc. of a metal object, has an effect on accuracy of brazed joints or brazed areas, since thermal expansion of the parts will differ, and may give rise to uneven fitness and large crevices. Other cases of uneven fitness may be caused by design of parts to be assembled, to movements when brazing the objects, or by manufacture of parts to be assembled. Therefore, one important aspect when brazing joints or areas etc. is the capability to fill and seal when brazing.

Copper (Cu) has good capability to seal large crevices. One of the reasons for not using Cu brazed objects is the limitation of the properties of the Cu braze-filler, e.g. Cu can induce different types of corrosion problems. The most obvious problem is that copper is consumed due to corrosion. The consummation of copper can decrease the mechanical strength of the object and the object can begin to leak. The release of Cu corrosion products and Cu-ions into the media in an object can give rise to galvanic corrosion in other parts of the same system where the object is installed. Silver braze-filler might be an option, but is normally not used since the price for silver is high.

Nickel (Ni) braze-fillers containing chromium (Cr) have better corrosion resistance than Cu braze-fillers, but Ni braze-fillers have some disadvantages. One of those is that nickel can be released from the nickel braze when used in water applications. The amount of nickel in tap water is limited by legislation. Ni-ions can also give rise to galvanic corrosion in other parts of the same system where the object is installed.

An important issue for the strength is the size of the crevices or gaps the brazing filler material is able to fill. The capability of nickel braze-fillers to fill crevices is limited and nickel brazing materials can also loose strength in large crevices, i.e. crevices larger than 0.076 mm. Thus, large Ni-brazed objects are difficult to produce.

The selection of a particular brazing filler metal for a specific application depends on a variety of factors. Basic considerations are temperature and the materials to be brazed. In any brazing process the brazing filler material must possess a solidus temperature that is high enough to provide the required properties to the brazed assembly. The process needs a liquidus temperature which is low enough to be compatible with the temperature capabilities of the parts to be joined. In accordance with one aspect of this invention there is provided a method of producing articles of stainless steel by brazing a base material of stainless steel with an alloy having mainly the same composition as the base material, thus providing a homogenized joint of the alloy between the base material or base materials. The brazing alloy comprises iron as the main component, and the alloy can be an iron-based alloy or an iron-based brazing filler material. The iron-based brazing filler material can be produced by gas- or water atomization, by melt spinning, mechanical alloying or by the crushing of ingots.

When brazing a joint it is suitable that the brazing material wets parts of the objects, which are to be brazed together, and that the brazing material can flow into crevices, joints, pores etc. during brazing. The melting point of the brazing filler material is suitable below the melting point of the base material of the parts. A relevant property of the brazing filler material is the capability to fill crevices, joints, pores etc. The nickel-based brazing materials have inferior capability of filling crevices, thus large size objects such as large Ni-brazed heat exchangers are very hard to produce.

The brazing material can be manufactured as a sheet, a powder, or a powder mixed with a binder forming a paste, or the brazing material may be dispersed in a mixture of binder and liquid, which can be painted or sprayed on a surface of base material.

The iron-based brazing filler material may be applied as a powder or as a paste one way may be to apply strings or drops of iron-based brazing filler material by pressing it through a nozzle. Another way of applying the iron-based brazing filler material may be to apply a binder in form of drops or strings on the base material and then scatter brazing powder over the surface.

The method of the invention comprises the following steps:
step (i) applying an iron-based brazing filler material to parts of stainless steel;
step (ii) optionally assembling the parts;
step (iii) heating the parts from step (i) or step (ii) to a temperature of at least 1000° C. in a non-oxidizing atmosphere, a reducing atmosphere, vacuum or combinations thereof, and heating the parts at the temperature of at least 1000° C. for at least 15 minutes; step (iv) providing articles having an average hardness of less than 600 HV1 of the obtained brazed areas; and
step (v) optionally repeating one or more of step (i), step (ii) and step (iii).

According to one alternative aspect of the invention comprises the method the following steps:
step (i) applying an iron-based brazing filler material to parts of stainless steel;
step (ii) optionally assembling the parts;
step (iii) heating the parts from step (i) or step (ii) to a temperature of at least 1000° C. in a non-oxidizing atmosphere, a reducing atmosphere, vacuum or combinations thereof, and heating the parts at the temperature of at least 1000° C. for at least 15 minutes;
step (iv) sealing or filling joints, pores, cracks, gaps, or crevices larger than 76 μm; and
step (v) optionally repeating one or more of step (i), step (ii) and step (iii).

The method according to another alternative aspect may also comprise repeating step (i), and applying the iron-based brazing filler material to one or more additional parts, or to the articles provided in step (iv); and assembling in step (ii) the parts or articles from repeating step (i) with one or more additional parts, or with the articles provided in step (iv), and repeating step (iii) and step (iv). This aspect enables the manufacture of articles having a complex design, which have to be brazed in a stepwise fashion.

According to another alternative aspect, the method comprises step (iii) heating to a temperature of at least 1100° C. According to yet another alternative aspect, the method comprises step (iii) heating to a temperature of at least 1150° C. The heating may be carried out for less than 15 minutes according to one alternative aspect. According to another alternative aspect of the invention objects are brazed for at least 15 minutes at a temperature above 1100° C., and longer brazing times are also relevant for many applications. The parts or articles may be heated to the temperature at which the brazing material melts. The method of the invention may comprise a step (iii) which includes preheating the parts to for example a temperature at least 400° C., at least 500° C. or even at least 550° C. and leaving the parts at that temperature for example for at least 15 minutes, at least 30 minutes, at least 1 hour, or even longer, then raising the temperature to for example at least 900° C., at least 1000° C. or even at least 1100° C. the parts are left at this temperature to equalise the temperature in the parts so that the temperature is equal throughout the parts and brazing material. The time to equalise depends on the size of the article to be brazed, for smaller objects a shorter time may be sufficient. Suitable times may be for example at least one hour, at least 2 hours, at least 3 hours, or even longer. The temperature depends on the liquidus-solidus temperature of the brazing material and the composition of the brazing alloy and the melting point lowering elements. After equalising the temperature in the parts to be brazed the temperature is raised to a brazing temperature.

Both brazing time and brazing temperature depend on the brazing material but also on the size and shape of the article to be brazed. The brazing may be divided into A) melting the brazing material, B) flowing the brazing material by capillary force between adjacent surfaces and setting the melted brazing material, and C) diffusing the elements of the brazing material with the base material or alloy of the parts to be brazed.

During the brazing process, the brazing material diffuses with the adjacent surfaces so that they and the brazing material together constitute a partly homogeneous material region.

If the temperature in the middle of the article is not high enough the middle portion will not be brazed because the brazing material will not melt, and the properties of the article will be inferior.

Examples of brazing times and temperature are: heating to at least 1100° C. and heating for at least 15 minutes according to one alternative aspect of the invention. Heating to at least 1100° C. and heating for at least 30 minutes according to another alternative aspect of the invention. Heating to at least 1100° C. and heating for at least 45 minutes according to yet another alternative of the invention. According to yet another alternative is the article heated for more than 60 minutes. According to a further alternative may the temperature be at least 1150° C. and the time may be at least 25 minutes A large heat exchanger may have several plates stacked together. The plate pack may comprise 10, 20, or more plates. A heat exchangers may have 100, 150, 200 or more plates. A large heat exchanger may be defined by the area of the heat exchanger plated another way of defining a big heat exchanger is the number of plates.

During the brazing process, the brazing material diffuses with the adjacent surfaces so that they and the brazing material together constitute a partly homogeneous material region.

To braze together planar surfaces and form tight joints may be hard to achieve by conventional methods. The present invention provides a method for brazing together two planar surfaces by using an iron-based brazing material containing melting point reducer in such a way that the brazing material's capillary-induced positioning between the surfaces can be controlled. The iron based brazing filler material may be applied to planar surfaces or to large surfaces by the aid of capillary force breakers. The capillary force breakers can be in form of grooves, traces, paths, passages, v or u shaped tracks or pathways etc. or in form of nets etc. The iron-based brazing filler material may be applied into the capillary force breakers, i.e. into the grooves, traces, paths, passages, v or u shaped tracks, pathways, nets etc., or may the brazing filler material be applied close to the capillary force breakers. During heating the applied iron-based brazing filler material will flow to the area where the capillary force may be broken and braze together the surfaces, which are adjacent to each other. Thus, the brazed area provides brazed, sealed or tight cervices, joints etc. between planar surface where it is hard otherwise to braze uniformly. The capillary force breakers enable also brazing of surfaces having large crevices, parts having odd shape, etc.

When the brazing material is applied between two parts close to a capillary force breaker the flowing viscous brazing material will stop the flowing motion and set at the rim of the capillary force breaker. A reactor channel may be functioning as a capillary force breaker. A plate having a reactor channel is applied with brazing material and a barrier plate or the like is placed in contact with the reactor channel plate. The flowing brazing material will stop and set at boarder of the reactor channel, which will seal the reactor plate against the barrier plate without filling the reactor channel with set brazing material.

How far the brazing material can flow between two bordering surfaces depends partly on the brazing materials setting time and the distance between the surfaces, and the amount of brazing material. Since the brazing material "sticks" to each surface, which is to be brazed, the intermediate space between the surfaces becomes smaller. As the intermediate space becomes smaller while at the same time the brazing material sets, it also becomes more difficult for the brazing material to flow in between.

The method may further comprise that in step (iii) the brazing may take place in presence of inert gas or active shielding gas. The heating or brazing may be carried out in presence of one or more of the gases selected from the group consisting of helium, argon, nitrogen, hydrogen, carbon dioxide, or one or more of the mentioned gases in combinations with vacuum.

According to yet another aspect of the present method may brazing zones or brazing areas, such as for example brazed joints, pores, cracks, gaps, crevices, and the like may be provided having an average hardness of less than 600 HV1. According to a further alternative aspect of the present method brazing zones or brazing areas may be provided that have an average hardness of less than 500 HV1. According to a further alternative aspect of the present method brazing zones or brazing areas may be provided that have an average hardness of less than 400 HV1. According to a further alternative aspect of the present method brazing zones or brazing areas may be provided that have an average hardness of less than 350 HV1. According to a further alternative aspect of the present method brazing zones or brazing areas may be provided that have an average hardness of less than 300 HV1.

Since the iron-based brazing filler materials have flow properties and wetting properties to allow for penetration into crevices, the iron-based brazing filler materials will create a bond with the base material, seal crevices, and be able to join planar surfaces by brazing. According to one alternative aspect of the invention the iron-based brazing filler materials can seal or fill pores, cracks, gaps, joints, or crevices larger than as large as 1000 μm, and may seal or fill pores, cracks, gaps, joints, or crevices up to 3000 μm or more. According to another alternative aspect of the method pores, cracks, gaps, joints, or crevices larger than 250 μm may be sealed or filled by the iron-based brazing filler material and the provided brazed zone or brazed area having average hardness of less than 350 HV1. According to another alternative aspect of the method pores, cracks, gaps, joints, or crevices larger than 1000 μm may be sealed or filled by the iron-based brazing filler material and the provided brazed zone or brazed area can have an average hardness of less than 350 HV1.

According to another alternative aspect of the method step (iv) can comprise sealing or filling of pores, cracks, gaps, joints, or crevices larger than larger than 300 μm, or combinations thereof, and provide brazed areas having an average hardness of less than 350 HV1 measured at a centre line or close to a centre line of the brazed area of filled crevices larger than 250 μm.

According to a further alternative aspect of the method step (iv) can comprise the sealing or filling of pores, cracks, gaps, joints, or crevices larger than larger than 350 μm, or combinations thereof, and provide brazed areas having an average hardness of less than 350 HV1 measured at a centre line or close to a centre line of the brazed area of filled crevices larger than 300 μm.

According to another alternative aspect of the method step (iv) may comprise the sealing or filling of pores, cracks, gaps, joints, or crevices larger than larger than 500 μm, or combinations thereof, and provide brazed areas having an average hardness of less than 390 HV1 measured at a centre line or close to a centre line of the brazed area of filled crevices larger than 400 μm.

The desired amount of brazing material is supplied to the contact points, which are to be brazed together in any of the described or other ways. The brazing material can cover an area that is somewhat larger than the contact joint point. The contact joint points may have a diameter of at least 0.5 mm.

According to the present method any suitable iron-based brazing filler material may be used. Suitable iron-based brazing filler materials may be selected from the material disclosed in WO 02/38327, WO 02/098600, U.S. Pat. No. 3,736,128, U.S. Pat. No. 4,402,742, U.S. Pat. No. 4,410,604, U.S. Pat. No. 4,516,716, U.S. Pat. No. 6,656,292, or EP 0 418 606. According to one alternative aspect of the present method the iron-based brazing filler materials may be selected from the material disclosed in WO 02/38327 or in WO 02/098600. According to another alternative aspect of the present method the iron-based brazing filler materials may comprise one or more of Si, B, P, Mn, C, or Hf. According to yet another alternative aspect of the present method the iron-based brazing filler material may comprise 9-30 wt % Cr, 5-25 wt % Ni, and at least one of 0-25 wt % Si, 0-6 wt % B, 0-15 wt % P, 0-8 wt %, Mn, 0-2 wt % C, 0-15 wt % Hf, and as an alternative balanced with other elements. According to another alternative aspect of the present method the iron-based brazing filler material may comprise at least 40 wt % Fe, 14-21 wt % Cr, 5-21 wt % Ni, 6-15 wt % Si, 0.2-1.5 wt % B, and as an alternative balanced with other elements. According to another alternative aspect of the present method the iron-based brazing filler material may comprise at least 40 wt % Fe, 14-21 wt % Cr, 5-21 wt % Ni, 4-9 wt % Si, 4-9 wt % P, and as an alternative be balanced with other elements. According to another alternative aspect of the present method the iron-based brazing filler material may comprise at least 40 wt % Fe, 14-21 wt % Cr, 5-21 wt % Ni, 7-15 wt % P, and as an alternative be balanced with other elements.

Since the brazing process is a metallic process and the respective surfaces for brazing take the form of metallic material, then iron-based brazing material during the brazing process diffuses with bordering surfaces, which are to be brazed together. The joint or seam between the two joined surfaces will more or less "disappear" during the brazing process according to one aspect of the invention. The brazed seam together with the surfaces of the metallic parts will become a unity with only small changes in material composition of the alloys.

The present invention also relates to an article of stainless steel obtained by employing the present method. The present invention relates further to a brazed article of stainless steel, which comprises at least one base material of stainless steel and a brazing filler material wherein the obtained brazed areas, pores, cracks, gaps, joints, or crevices have a tensile strength of at least about 110 N/mm². According to one alternative aspect the brazed areas, pores, cracks, gaps, joints, or crevices can have a tensile strength of at least about 120 N/mm².

The present invention also relates to a brazed article of stainless steel, which comprises at least one base material of stainless steel and a iron-based brazing filler material, wherein the obtained brazed areas, pores, cracks, gaps, joints, or crevices have an average hardness of less than about 600 HV1. According to one alternative aspect the brazed article of stainless steel may comprise at least one base material of stainless steel and an iron-based brazing filler material wherein the obtained brazed areas, pores, cracks, gaps, joints, or crevices having an average hardness less than about 500 HV1. According to another alternative aspect may the brazed article of stainless steel may comprise at least one base material of stainless steel and an iron-based brazing filler material wherein the obtained brazed areas, pores, cracks, gaps, joints, or crevices have an average hardness of less than about 450 HV1. According to yet another alternative aspect the brazed article of stainless steel may comprise at least one base material of stainless steel and an iron-based brazing filler material wherein the obtained brazed areas, pores, cracks, gaps, joints, or crevices have an average hardness less than 350 HV1. The "at least one base material of stainless steel" according to one alternative of the invention one base material can be stainless steel brazed together by the iron-based brazing filler material. The "at least one base material of stainless steel" according to another alternative of the invention one base material can be stainless steel and another base material of another metal alloy brazed together by the iron-based brazing filler material.

According to one alternative aspect the articles or the parts may be selected from reactors, separators, columns, heat exchangers, or equipments for chemical plants or food plants, or for car industry. According to another alternative aspect the objects may be heat exchangers, plate reactors, or combinations thereof.

According to another alternative aspect of the invention the brazed article may be a paring disc, which is used in a separator.

According to one alternative aspect the articles maybe brazed heat exchanger plates, brazed reactor plates, or combinations thereof having a burst pressure of at least about 60 Bar. According to another alternative aspect the articles maybe brazed heat exchanger plates, brazed reactor plates, or combinations thereof having a burst pressure of at least about 65 Bar. According to another alternative aspect the articles may be brazed heat exchanger plates, brazed reactor plates, or combinations thereof having a burst pressure of at least about 80 Bar. According to yet another alternative aspect the articles maybe a heat exchanger having a heat exchanger plate area larger than about 0.20 m$^2$, a burst pressure of at least 65 Bar, and a porthole area of larger than about 0.003 m$^2$.

When the parts are heat exchanger plates, the plates can be endplates, adaptor plates, sealing plates, frame plates etc., and constitute a heat exchanger system. Each of the heat exchanger plates comprise at least one port recess, which port recesses together form part of a port channel when the plates are placed on one another. The plates are stacked together in a plate stack or a plate pack in the heat exchanger. The plate package comprises between the plates a number of channels, which accommodate a number of media. The media in adjacent channels is subject to temperature transfer through the heat transfer plate in a conventional manner. The plates may comprise an edge, which may partly extend down and over the edge portion of an adjacent heat transfer plate in the plate stack. The edges of the plates seal against the adjacent heat transfer plate in such a way that a channel may be formed between the plates. This channel either allows flow of a medium or is closed so that no flow takes place and the channel is therefore empty. To stiffen the plate package and the port regions, an adaptor plate or an endplate may be fitted to the package. The surfaces of the endplate or the adaptor plate are substantially planar so that contact surfaces between the surfaces may be maximised. As previously mentioned, the respective port recesses on the plates coincide, thereby forming a channel. On the inside of this port channel there is therefore a joint between the two plates. To prevent leakage at this joint brazing material may be applied around the port region between the plates. The brazing material may be placed in or close to a capillary force breaker, which may extend wholly or partly around the port region between the plates. In the plate package brazing material may be applied on different pre-designed or predetermined parts of the plates. During the brazing process, the brazing material will become viscous and will flow from the applied parts out between the plates due to the action of capillary force. The advantage of applying brazing material onto predetermined places makes it possible to control the volume and amount of the brazing material, and to control which parts of the surfaces are to be brazed and which are not. When brazing a heat exchanger at least three heat exchanger plates are needed, but it is usual that several plates are brazed together. According to one alternative aspect of the invention a plate pack of several plates are brazed together at the same time in the same oven.

The brazing method of the invention may either comprise brazing the article assembled with all its parts at the same time or the article may be brazed in a stepwise fashion where parts are first assembled and brazed together, and then assembled with further parts and brazed together, and so on using the same type of brazing material in each brazing cycle.

According to a further alternative aspect of the invention the articles may be provided wherein the brazed areas, pores, cracks, gaps, joints, or crevices having a silicone content of at least about 2 wt % Si.

Further aspects and embodiments of the invention are defined by the sub-claims.

In the following the present invention will be explained in more detail by means of the attached photos.

DETAILED DESCRIPTION OF THE PREFERRED EMBODIMENTS

Figure 1:
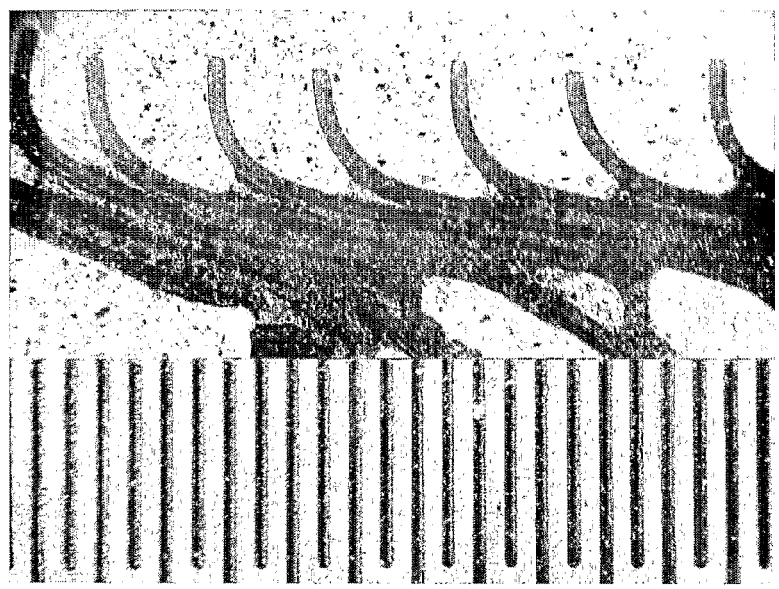
FIG. 1 is a photo showing a cross section of a part of a heat exchanger.

As shown in FIG. 1, an iron-based brazing filler material is able to fill large cervices, and that it is possible to braze with large quantities of brazing material. The large heat exchangers braze joints contain a lot of braze filler applied and also that large homogenisation zones are found. A part of the braze filler and part of the original plate thickness have been mixed into the homogenisation zone.

Figure 2:
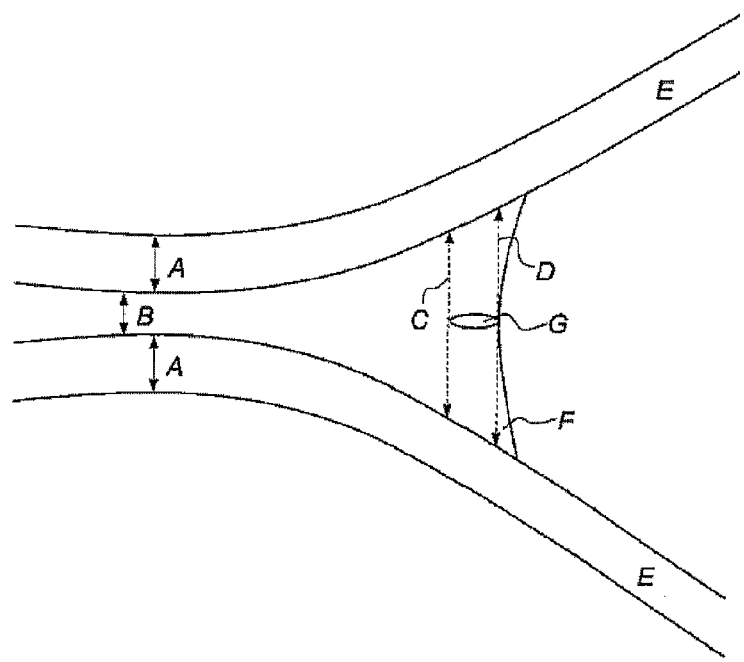
FIG. 2 is a schematic drawing showing a cross section of a joint.

FIG. 2 is schematically shows relationships between different parameters in a brazed crevice or joint, brazed by filler material F. Letter A represents the plate thickness of plate E which also represents base material E. The letter B represents the smallest thickness of a brazed crevice or joint between base material E or plates E. The letter C represents the largest thickness of a brazed crevice or joint without any pores, cracks or passages, and letter D represents the largest thickness of a brazed crevice or joint where any pores, cracks or passages G opens up to but is still sealed. If there is no trace of any pores, cracks or passages then C=D. For nickel based filler material C=D is less than C=D for iron based filler material. The presences of pores, cracks or passages make the brazed zone less strong.

Figure 3:
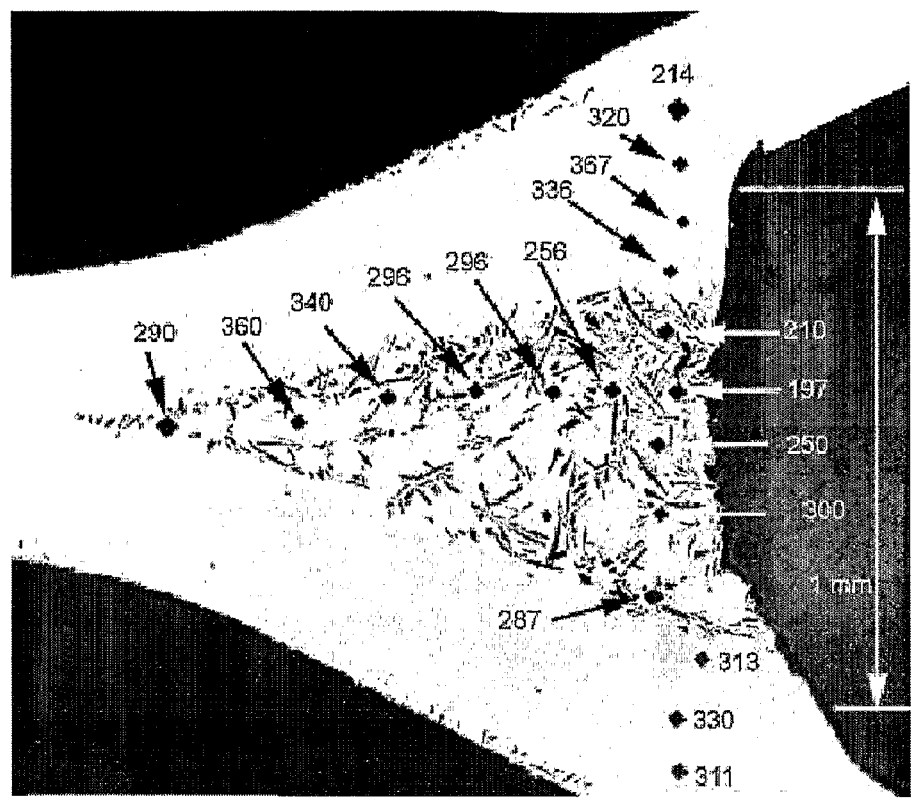
FIG. 3 is a photo showing a cross section of a joint on which hardness tests are carried out.

FIG. 3 is a photo showing a cross section of a joint on which hardness tests have been carried out. The average hardness is calculated as a numeric average and depends on the number of tests.

The invention will be further illustrated in the Examples, which are for the purpose of clarifying the invention and not to limit its scope. If not otherwise stated in the examples and tables percentages are given by weight (wt %).

Example 1

Test samples having geometry similar to the plate pattern inside brazed thin walled pressed heat exchanger plates were tested. The applied amount of braze-filler material was approximately 16 to 20 g per 4 brazing points. A nickel based braze filler BNi-5 according to AWS A5.8 AMS specifications for braze-fillers was compared to an iron-based braze-filler comprising 56 wt % Fe, 17 wt % Cr, 12 wt % Ni, 12 wt % Si, and 1 wt % B. The braze filler was applied to the test samples having 0.3-0.4 mm crevices, and the samples were heated in a furnace to a temperature of about 1200° C. in a non-oxidative atmosphere. The test results are summarised in Table 1.

TABLE 1

| Sample [g] | Ni-based BNi-5 [N/mm²] | Iron-based [N/mm²] |
|---|---|---|
| 16 | 109 | 123 |
| 18 | 110 | 126 |
| 20 | 106 | 151 |

The test results show that the Fe-based braze-filler, can fill crevices that are large see FIG. 1, and can obtain very good strength at the same time compared to Ni-based braze-fillers. Even at the test amount, it can be seen that the Fe-braze has the best mechanical strength of the tested fillers. FIG. 1 shows a cross-section of a Fe-based brazed heat exchanger. In the picture, it can be seen that crevices between 0.4-0.6 mm are tightened.

Example 2

Now it has been found that the iron based braze-filler not only has the capability of filling large crevices but also has a very high mechanical strength at large crevices, making them suitable for brazing for example large heat exchangers or planar surfaces of for example reactor plates. Tests were performed by comparing the amount of braze filler to tensile strength, the results are summarised in Table 2.

TABLE 2

| Sample [g] | Iron based (invention) [N/mm²] |
|---|---|
| 25 | 162 |
| 55 | 227 |

Example 3

A series of tests were performed by changing the heat treatment cycle of the brazening process to obtain as good a filling as was possible. A significant difference was discovered, even at a very short heat treatment cycle (5 minutes), very good filling was obtained with the Fe-based filler. The brazing tests were carried out at 1100° C. comparing the ability to fill crevices between a nickel based filler (BNi-5) and an iron based filler comprising 56 wt % Fe, 17 wt % Cr, 12 wt % Ni, 12 wt % Si, and 1 wt % B. The results are summarized in Table 3.

TABLE 3

| Time [minutes] | C FIG. 2 BNi-5 [μm] | C FIG. 2 iron-based filler [μm] |
|---|---|---|
| 5 | 130 | 800-1200 |
| 15 | 180 | 800-1200 |
| 30 | 220 | 800-1200 |
| 150 | 300 | 800-1200 |

The test results show that BNi-5 needs a long heat treatment to braze larger joints, but even after long heat treatment times BNi-5 did not fill crevices as good as the iron-based filler. The iron-based filler filled larger crevices in very short time compared to BNi-5. The longer brazing times for BNi-5 are therefore more energy consuming than those for the iron based filler.

Example 4

The hardness tests were made in a joint at an equally sealed gap between two plates of base material (type 316). The tests were performed on an equal distance from the base material, in the centre of the joint. Hardness measurements HV1 were performed according to ASTM E92-82 (Standard test method for Vickers Hardness of Metallic Materials) and EN ISO 6507-1 (Metallic materials—Vickers hardness test—Part 1: Test method (ISO 6507-1:1997), and a comparison was made between a joint of BNi-5 and a joint of Fe-based material 56 wt % Fe, 17 wt % Cr, 12 wt % Ni, 12 wt % Si, and 1 wt % B. The results are summarised in Table 4.

TABLE 4

| Joint made with BNi-5 [HV1] | Joint made with Fe-based material [HV1] |
|---|---|
| 490 | 260 |
| 600 | 210 |
| 520 | 280 |
| 480 | 270 |

The hardness test results show that BNi-5 joint is harder than the Fe-based material joint. Thus, the BNi-5 joint shows less ductility and consequently lower strength than the iron-based filler joint according to the invention, which is illustrated by lower hardness values of the iron-based filler joint. Thus, the BNi-5 joint is brittle compared to the iron-based filler joint.

Example 5

Hardness tests were preformed on a large joint sealed with Fe-based filler comprising 56 wt % Fe, 17 wt % Cr, 12 wt % Ni, 12 wt % Si, and 1 wt % B. The tests were performed where the brazed joint has sealed a gap larger than 1000 μm, and the positions where the tests were done as in FIG. 3, but the photo in FIG. 3 is not a photo of the joint in this Example. The results are 349 HV1, 336 HV1, 210 HV1, 197 HV1, 250 HV1, 300 HV1, and 287 HV1, which gives average hardness of 275 HV1.

Example 6

In this example tests were carried out to produce a heat exchanger without leakage, i.e. which is fully brazed without defaulting joints. An iron-based filler defined in WO 02/38327 was applied between pressed plates. For each test 20 plates were used. The plates had an approximate dimension of: width 400 mm, length 1000 mm, and thickness 0.4 mm. The plates were placed on a fixture, and on top of the plates was a fixture with a weight placed. The pack of plates was heated in a vacuum furnace. Several brazing tests were carried out with heat exchanger plate packs, and the tests were carried out in different heat treatment cycles.

In all tests of the heat treatment cycles the heat exchange plate pack was first heated to 500° C. for 1 hour, then the temperature was raised to 1100° C. for 4 hours to ensure heating of the whole plate pack.

Test A: The furnace was heated from 1100° C. to 1200° C. for 5 minutes, and then the heat was lowered to 1100° C. for approximately 30 minutes.

Test B: The furnace was heated from 1100° C. to 1200° C. for 15 minutes, and then the heat was lowered to 1100° C. for approximately 30 minutes.

Test C: The furnace was heated from 1100° C. to 1200° C. for 30 minutes, and then the heat was lowered to 1100° C. for approximately 30 minutes.

Test D: The furnace was heated from 1100° C. to 1200° C. for 60 minutes, and then the heat was lowered to 1100° C. for approximately 30 minutes.

Analysis: The plate packs were cut into sections to be analysed if the iron-based filler in the centre part of the plate pack had melted or not. The tested parts were optically investigated.

RESULTS

Test A: Filler in the centre not melted.
Test B: Filler in the centre not melted.
Test C: Filler in the centre partly melted (more sintered).
Test D: Filler in the centre melted.

What is claimed is:

1. A method of brazing an article comprising stainless steel parts, the method, comprising:
    applying an iron-based brazing filler material to the parts to be brazed and assembling the parts together, the iron-based brazing filler material comprising at least 40 wt % Fe, 14-21 wt % Cr, 5-21 wt % Ni, 0-8 wt % Mn, 0-2 wt % C, 0-15 wt % Hf and, either 6-15 wt % Si and 0.2-1.5 wt % B, or 4-9 wt % Si and 4-9 wt % P
    preheating the assembled parts in a non-oxidizing atmosphere, a reducing atmosphere, vacuum or combinations thereof to at least 400° C. and leaving the parts at the temperature of at least 400° C. for at least 15 minutes, and then raising the temperature to at least 900° C. and leaving the parts at the temperature of at least 900° C. for at least one hour to equalize the temperature of the parts so that the temperature is equal through the parts and the brazing material, the assembled parts then being heated to a brazing temperature of at least 1100° C. for at least 30 minutes to braze the parts and so that the brazing material flows into joints, pores, cracks, gaps or crevices to be filled or sealed; and
    allowing the brazing material to set thereby to form in the brazed article brazed areas having an average hardness of less than 600 HV1.

2. The method according to claim 1, wherein the brazed article is a sub-assembled part that is further brazed with one or more additional parts, the iron-based brazing filler material is applied to the parts to be further brazed, and after assembling the parts to be further brazed the steps of preheating the parts and then heating the parts to a brazing temperature of at least 1100° C. for at least 30 minutes is repeated.

3. The method according to claim 1, wherein joints, pores, cracks, gaps or crevices larger than 76 μm are filled or sealed by the brazing material flowing into the joints, pores, cracks, gaps or crevices and being allowed to set.

4. The method according to claim 3, wherein joints, pores, cracks, gaps and crevices larger than 300 μm are sealed or filled by the brazing material, and the brazed areas have an average hardness of less than 350 HV1 measured at a or close to a centre line of the brazed area of a filled crevice larger than 250 μm.

5. The method according to claim 3, wherein joints, pores, cracks, gaps or crevices larger than 250 μm, or combinations thereof, are sealed or filled by the brazing material, and the brazed areas have an average hardness of less than 350 HV1 measured at a or close to a centre line of the brazed area.

6. The method according to claim 3, wherein joints, pores, cracks, gaps or crevices larger than 350 μm, or combinations thereof, are sealed or filled with the brazing material, and the brazed areas have an average hardness of less than about 350 HV1 measured at a or close to a centre line of the brazed area of a filled crevice larger than 300 μm.

7. The method according to claim 1, wherein the iron-based brazing material is obtained by gas atomization, by water atomization, or by crushing of ingots, and the iron-based brazing material is applied to the stainless steel parts as a paste, in strings or in drops.

8. The method according to claim 1, wherein the iron-based brazing material is applied with aid of capillary force breakers in form of grooves, paths, traces, passages, v- or u-shaped tracks, pathways, nets, or combinations thereof, on stainless steel to be brazed.

9. The method according to claim 1, wherein the assembled parts are heated to at least 1000° C. for at least three hours to equalize the temperature in the assembled parts, and are then heated to a brazing temperature of at least 1150° C. so that the brazing material flows into the joints, pores, cracks, gaps or crevices to be filled and sealed.

10. The method according to claim 9, wherein the article comprises brazed heat exchanger plates, brazed reactor plates or combinations thereof, and the article has a burst pressure of at least 60 Bar.

11. The method according to claim 10, wherein the brazed article is a plate heat exchanger plate pack, and the assembled parts are stainless steel plates having an area larger than 0.20 m$^2$ and a porthole area of at least 0.0003 m$^2$, iron based brazing material being applied to the heat exchanger plates to be brazed together and the plates being assembled into a pack, and the assembled plate pack being heated to the brazing temperature of at least 1150° C. so that the brazing material flows into the joints, pores, cracks, gaps or crevices to be filled and sealed.

12. The method according to claim 11, wherein the heat exchanger has a plate pack of more than 9 heat exchanger plates brazed together.

13. The method according to claim 1, wherein the brazed areas of the brazed article have a tensile strength of at least 110 N/mm$^2$.

* * * * *